United States Patent
Ali et al.

(10) Patent No.: US 9,961,683 B2
(45) Date of Patent: May 1, 2018

(54) UL SERVING LINK'S ROLE CHANGE IN HETEROGENEOUS NETWORK

(71) Applicant: Nokia Solutions and Networks Oy, Espoo (FI)

(72) Inventors: Amaanat Ali, Bangalore (IN); Marcin Rybakowski, Rawicz (PL); Hans Thomas Hoehne, Helsinki (FI); Karri Markus Ranta-Aho, Espoo (FI); Alexander Sayenko, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days. days.

(21) Appl. No.: 14/781,966

(22) PCT Filed: Apr. 5, 2013

(86) PCT No.: PCT/EP2013/057220
§ 371 (c)(1),
(2) Date: Oct. 2, 2015

(87) PCT Pub. No.: WO2014/161601
PCT Pub. Date: Oct. 9, 2014

(65) Prior Publication Data
US 2016/0029388 A1    Jan. 28, 2016

(51) Int. Cl.
*H04W 72/04*   (2009.01)
*H04W 72/12*   (2009.01)
*H04W 24/04*   (2009.01)
*H04W 36/04*   (2009.01)
*H04W 84/04*   (2009.01)

(52) U.S. Cl.
CPC ....... *H04W 72/0453* (2013.01); *H04W 24/04* (2013.01); *H04W 72/1278* (2013.01); *H04W 36/04* (2013.01); *H04W 84/045* (2013.01)

(58) Field of Classification Search
CPC ............. H04W 72/0453; H04W 24/04; H04W 72/1278; H04W 84/045; H04W 36/04
See application file for complete search history.

(56) References Cited

U.S. PATENT DOCUMENTS

2003/0185159 A1* 10/2003 Seo ........................ H04L 1/0026
                                                                  370/278
2008/0200202 A1*  8/2008 Montojo ............... H04W 52/06
                                                                  455/522
(Continued)

FOREIGN PATENT DOCUMENTS

EP        2 378 826 A1    10/2011

OTHER PUBLICATIONS

3GPP TSG RAN WG1 Meeting #72, St. Julian's, Malta, Jan. 28-Feb. 1, 2013, R1-130566, "Physical layer aspects of dual connectivity", Ericsson, ST-Ericsson, 8 pgs.
(Continued)

*Primary Examiner* — Hashim Bhatti
(74) *Attorney, Agent, or Firm* — Harrington & Smith

(57) ABSTRACT

It is provided a method, including identifying a weak cell serving a downlink of a first user device; detecting a strong cell different from the weak cell, wherein an uplink of the first user device has a lower uplink path loss towards the strong cell than towards the weak cell; preventing the weak cell from providing a first grant for the uplink, if the strong cell is detected.

18 Claims, 9 Drawing Sheets

(56) References Cited

U.S. PATENT DOCUMENTS

| | | | |
|---|---|---|---|
| 2010/0220624 A1* | 9/2010 | Ma | H04W 74/004 370/252 |
| 2010/0240383 A1* | 9/2010 | Ankel | H04L 47/10 455/452.1 |
| 2011/0040888 A1* | 2/2011 | Krishnaswamy | H04L 63/0884 709/231 |
| 2012/0309405 A1* | 12/2012 | Parkvall | H04W 48/08 455/452.1 |
| 2013/0079013 A1* | 3/2013 | Shi | H04W 36/18 455/437 |
| 2013/0176988 A1* | 7/2013 | Wang | H04W 28/08 370/331 |
| 2013/0337795 A1* | 12/2013 | Falconetti | H04L 5/001 455/419 |
| 2014/0056243 A1* | 2/2014 | Pelletier | H04W 74/04 370/329 |
| 2014/0105180 A1* | 4/2014 | Grant | H04W 36/30 370/332 |
| 2014/0194120 A1* | 7/2014 | Wang | H04W 36/32 455/436 |
| 2014/0211748 A1* | 7/2014 | Gunnarsson | H04W 72/02 370/329 |
| 2014/0341123 A1* | 11/2014 | Wong | H04W 52/244 370/329 |
| 2014/0355568 A1* | 12/2014 | Gunnarsson | H04W 72/085 370/331 |
| 2015/0208282 A1* | 7/2015 | Grant | H04W 36/18 370/331 |

OTHER PUBLICATIONS

Ericsson et al: "Physical layer aspects of dual connectivity", 3GPP Draft; R1-130566, vol. RAN WG1, No. St. Julian; Jan. 28, 2013-Feb. 1, 2013 Jan. 19, 2013 (Jan. 19, 2013), Retrieved from the Internet: URL:http://www.3gpp.org/ftp/tsg_ran/WG1_RL 1/TSGR1_72/Docs/ [retrieved on Jan. 19, 2013] paragraph [2.1.1].

* cited by examiner

UL SERVING LINK'S ROLE CHANGE IN HETEROGENEOUS NETWORK

FIELD OF THE INVENTION

The present invention relates to an apparatus, a method, a system, and a computer program product for heterogeneous networks. More particularly, the present invention relates to an apparatus, a method, a system, and a computer program product for interference management in heterogeneous networks.

BACKGROUND OF THE INVENTION

Abbreviations 3G 3$^{rd}$ Generation
3GPP 3$^{rd}$ Generation Partnership Project
ASU Active Set Update
BLER Block Error Rate
CIO Cell Individual Offset
CPICH Common Pilot Channel
DL Downlink
DPCH Dedicated Physical Channel
DPCCH Dedicated Physical Control Channel
DPDCH Dedicated Physical Data Channel
E-DCH Enhanced Dedicated Channel
E-DPDCH E-DCH DPDCH
E-RNTI E-DCH RNTI
E-SCC Enhanced SCC
E-TFCI Enhanced TFCI
E-UTRAN Evolved Universal Terrestrial Radio Access Network
F-DPCH Fractional DPCH
HARQ Hybrid Automatic Repeat Request
HetNet Heterogeneous Network
HO Handover
HSDPA High Speed Downlink Packet Access
HS-DPCCH High Speed DPCCH
HSUPA High Speed Uplink Packet Access
ILPC Inner Loop Power Control
LPN Low Power Node
LTE Long Term Evolution
MAC Medium Access Control
MAC-e PDU MAC-enhanced Protocol Data Unit
NBAP NodeB Application Protocol
OLPC Outer Loop Power Control
PC Power Control
P-CPICH Primary CPICH
PDU Protocol Data Unit
RAN Radio Access Network
Rel Release
RL Radio Link
RNC Radio Network Controller
RNTI Radio Network Temporary Identifier
RoT Rise over Thermal (noise)
RRC Radio Resource Control
RRM Radio Resource Management
RTWP Received Total Wideband Power
SCC Serving Cell Change
SCCH Shared Control Channel
SHO Soft Handover
SI Scheduling Indicator
SINR Signal to Interference and Noise Ratio
SIR Signal to interference Ratio
TFCI Transport Format Combination Indicator
TPC Transmit Power Control
TTI Transmission Timing Interval
UE User Equipment
UL Uplink
UTRAN Universal Terrestrial Radio Access Network In a heterogeneous network (HetNet), macro cells are complemented by one or more smaller cells such as micro cells or pico cells.

Inter-cell interference is already one of the limiting factors in today's mobile communications systems, especially in dense, urban deployments. In case of HetNets, inter-cell interferences are even more severe due to the fact that small cells will be deployed within the coverage area of a macro cell (macro base station), as shown in FIG. 1.

One of the reasons of particularly high interferences in HetNet deployments is UL/DL link imbalance due to fact that DL coverage of small cell is lower than UE UL coverage. This imbalance does not exist in deployments with macro cells only.

Small cells have a much lower DL transmission power than a macro cell. However, the UL power of a UE is maintained at the same level to be received by the serving Macro.

FIG. 1 shows a macro BTS with its coverage area (large ellipse), in which a micro BTS or pico BTS (hereinafter: small BTS) is placed. The coverage area of the small BTS is indicated by the small ellipse inside the coverage area of the large ellipse. UEs are shown which are only in the coverage area of the macro BTS, and others, which are fully inside the coverage area of the small BTS. These UEs are served by the respective BTS. In addition, some UEs are shown at the border of the coverage area of the small BTS. These UEs are served by the macro BTS. Through their UL signals to the macro BTS, they cause strong UL interferences to the small BTS.

Qualcomm proposes HS-DPCCH boosting to overcome the problems of the imbalance.

SUMMARY OF THE INVENTION

It is an object of the present invention to improve the prior art. In detail, it is an object to mitigate interference in HetNets.

According to a first aspect of the invention, there is provided an apparatus, comprising identifying means adapted to identify a weak cell serving a downlink of a first user device; detecting means adapted to detect a strong cell different from the weak cell, wherein an uplink of the first user device has a lower uplink path loss towards the strong cell than towards the weak cell; preventing means adapted to prevent the weak cell from providing a first grant for the uplink, if the strong cell is detected.

The apparatus may further comprise separation indication providing means adapted to provide, if the strong cell is detected, a separating message to the first user device, wherein the separating message indicates that a transmission power of the uplink is based on a second grant received from the strong cell.

According to a second aspect of the invention, there is provided an apparatus, comprising identifying processor adapted to identify a weak cell serving a downlink of a first user device; detecting processor adapted to detect a strong cell different from the weak cell, wherein an uplink of the first user device has a lower uplink path loss towards the strong cell than towards the weak cell; preventing processor adapted to prevent the weak cell from providing a first grant for the uplink, if the strong cell is detected.

The apparatus may further comprise separation indication providing processor adapted to provide, if the strong cell is detected, a separating message to the first user device, wherein the separating message indicates that a transmission power of the uplink is based on a second grant received from the strong cell.

According to a third aspect of the invention, there is provided an apparatus, comprising identifying means adapted to identify a weak cell serving a downlink of a first user device; detecting means adapted to detect a strong cell different from the weak cell, wherein an uplink of the first user device has a lower uplink path loss towards the strong cell than towards the weak cell; transfer instructing means adapted to instruct the strong cell to transfer a second grant for the uplink to the weak cell, if the strong cell is detected; grant instructing means adapted to instruct the weak cell to provide a first grant based on the second grant to the first user device, if the strong cell is detected.

According to a fourth aspect of the invention, there is provided an apparatus, comprising identifying processor adapted to identify a weak cell serving a downlink of a first user device; detecting processor adapted to detect a strong cell different from the weak cell, wherein an uplink of the first user device has a lower uplink path loss towards the strong cell than towards the weak cell; transfer instructing processor adapted to instruct the strong cell to transfer a second grant for the uplink to the weak cell, if the strong cell is detected; grant instructing processor adapted to instruct the weak cell to provide a first grant based on the second grant to the first user device, if the strong cell is detected.

The apparatus according to any of the first to fourth aspects may further comprise maintain instructing means or maintain instructing processor adapted to instruct the weak cell to maintain serving the downlink if the strong cell is detected.

In the apparatus according to any of the first to fourth aspects, the detecting means or detecting processor may be adapted to detect the strong cell if a message is received from the weak cell, wherein the message indicates that the first user device does not react to a third grant provided by the weak cell for the uplink.

In the apparatus according to any of the first to fourth aspects, the detecting means or detecting processor may be adapted to detect the strong cell if it is detected that an active set of the first user device contains the weak cell and the strong cell, wherein a power of a first primary common pilot channel from the weak cell to the first user device is different from a power of a second primary common pilot channel from the strong cell to the first user device.

In the apparatus according to any of the first to fourth aspects, the detecting means or detecting processor may be adapted to detect the strong cell if it is detected that an uplink throughput of a second user device different from the first user device is below an uplink throughput threshold.

In the apparatus according to any of the first to fourth aspects, the first grant may comprise at least one of a power control to increase a power on the uplink, an absolute power control to set the power on the uplink, and a data rate control to set the data rate on the uplink.

According to a fifth aspect of the invention, there is provided a radio network controller comprising an apparatus according to any of the first to fourth aspects.

According to a sixth aspect of the invention, there is provided an apparatus, comprising first monitoring means adapted to monitor if a preventing command to prevent providing a first grant for an uplink of a first user device is received; first preventing means adapted to prevent the providing of the first grant if the preventing command is received.

According to a seventh aspect of the invention, there is provided an apparatus, comprising first monitoring processor adapted to monitor if a preventing command to prevent providing a first grant for an uplink of a first user device is received; first preventing processor adapted to prevent the providing of the first grant if the preventing command is received.

According to an eighth aspect of the invention, there is provided an apparatus, comprising second monitoring means adapted to monitor if a transfer command to use a second grant for an uplink of a first user device is received, wherein the second grant is received from a base station device different from the apparatus; providing means adapted to provide a first grant based on the second grant to the first user device.

The apparatus may further comprise calculating means adapted to calculate a calculated grant for the uplink; second preventing means adapted to prevent providing the calculated grant to the first user device if the transfer command is received.

According to a ninth aspect of the invention, there is provided an apparatus, comprising second monitoring processor adapted to monitor if a transfer command to use a second grant for an uplink of a first user device is received, wherein the second grant is received from a base station device different from the apparatus; providing processor adapted to provide a first grant based on the second grant to the first user device.

The apparatus may further comprise calculating processor adapted to calculate a calculated grant for the uplink; second preventing processor adapted to prevent providing the calculated grant to the first user device if the transfer command is received.

The apparatus according to any of the sixth to ninth aspects may further comprise first detecting means or first detecting processor adapted to detect that the first user device does not react to a third grant for the uplink provided by the apparatus to the first user device; first providing means or first providing processor adapted to provide, if it is detected that the first user device does not react, a stuck indication message to a first control device different from the apparatus.

The apparatus according to any of the sixth to ninth aspects may further comprise second detecting means or second detecting processor adapted to detect that an uplink throughput of a second user device different from the first user device is below an uplink throughput threshold; second providing means or second providing processor adapted to provide, if it is detected that the uplink throughput is below the threshold, a throughput indication message to a second control device different from the apparatus.

In the apparatus according to any of the sixth to ninth aspects, the first grant may comprise at least one of a power control to increase a power on the uplink, an absolute power control to set the power on the uplink, and a data rate control to set the data rate on the uplink.

According to a tenth aspect of the invention, there is provided an apparatus, comprising monitoring means adapted to monitor if a separating message indicating a separation of an uplink grant for an uplink of a user device and a serving downlink serving the user device is received; providing means adapted to provide, if the separating message is received, the uplink grant for the uplink of the user device.

The apparatus may further comprise first preventing means adapted to prevent, if the separating message is received, providing a downlink grant for a downlink from the apparatus to the user device.

According to an eleventh aspect of the invention, there is provided an apparatus, comprising monitoring processor adapted to monitor if a separating message indicating a separation of an uplink grant for an uplink of a user device and a serving downlink serving the user device is received; providing processor adapted to provide, if the separating message is received, the uplink grant for the uplink of the user device.

The apparatus may further comprise first preventing processor adapted to prevent, if the separating message is received, providing a downlink grant for a downlink from the apparatus to the user device.

According to a twelfth aspect of the invention, there is provided an apparatus, comprising monitoring means adapted to monitor if a separating message indicating a separation of an uplink grant for an uplink of a user device and a serving downlink serving the user device is received; calculating means adapted to calculate the uplink grant for the uplink; transferring means adapted to transfer, if the separating message is received, the calculated uplink grant to a base station device different from the user device.

The apparatus may further comprise second preventing means adapted to prevent, if the separating message is received, providing the calculated uplink grant to the user device.

According to a thirteenth aspect of the invention, there is provided an apparatus, comprising monitoring processor adapted to monitor if a separating message indicating a separation of an uplink grant for an uplink of a user device and a serving downlink serving the user device is received; calculating processor adapted to calculate the uplink grant for the uplink; transferring processor adapted to transfer, if the separating message is received, the calculated uplink grant to a base station device different from the user device.

The apparatus may further comprise second preventing processor adapted to prevent, if the separating message is received, providing the calculated uplink grant to the user device.

In the apparatus according to any of the tenth to thirteenth aspects, the uplink grant may comprise at least one of a power control to increase a power on the uplink, an absolute power control to set the power on the uplink, and a data rate control to set the data rate on the uplink.

According to a fourteenth aspect of the invention, there is provided a base station, comprising an apparatus according to any of the sixth to thirteenth aspects.

According to a fifteenth aspect of the invention, there is provided an apparatus, comprising downlink means adapted to be served on a downlink by a weak cell, wherein the serving on the downlink is based on a schedule received from the weak cell; uplink control means adapted to control at least one of a transmission power and a data rate of an uplink of the apparatus based on a grant received from a strong cell different from the weak cell.

The apparatus may further comprise separating monitoring means adapted to monitor if a separating message is received, wherein the separating message indicates that the at least one of the transmission power and the data rate of the uplink is based on the grant received from the strong cell; and wherein the uplink control means is adapted to control the at least one of the transmission power and the data rate only if the separating message is received.

In the apparatus, the grant may comprise at least one of a power control to increase a power on the uplink, an absolute power control to set the power on the uplink, and a data rate control to set the data rate on the uplink.

According to a sixteenth aspect of the invention, there is provided an apparatus, comprising downlink processor adapted to be served on a downlink by a weak cell, wherein the serving on the downlink is based on a schedule received from the weak cell; uplink control processor adapted to control at least one of a transmission power and a data rate of an uplink of the apparatus based on a grant received from a strong cell different from the weak cell.

The apparatus may further comprise separating monitoring processor adapted to monitor if a separating message is received, wherein the separating message indicates that the at least one of the transmission power and the data rate of the uplink is based on the grant received from the strong cell; and wherein the uplink control processor is adapted to control the at least one of the transmission power and the data rate only if the separating message is received.

In the apparatus, the grant may comprise at least one of a power control to increase a power on the uplink, an absolute power control to set the power on the uplink, and a data rate control to set the data rate on the uplink.

According to a seventeenth aspect of the invention, there is provided a user equipment, comprising an apparatus according to any of the fifteenth and sixteenth aspects.

According to an eighteenth aspect of the invention, there is provided a method, comprising identifying a weak cell serving a downlink of a first user device; detecting a strong cell different from the weak cell, wherein an uplink of the first user device has a lower uplink path loss towards the strong cell than towards the weak cell; preventing the weak cell from providing a first grant for the uplink, if the strong cell is detected.

The method may further comprise providing, if the strong cell is detected, a separating message to the first user device, wherein the separating message indicates that a transmission power of the uplink is based on a second grant received from the strong cell.

According to a nineteenth aspect of the invention, there is provided a method, comprising identifying a weak cell serving a downlink of a first user device; detecting a strong cell different from the weak cell, wherein an uplink of the first user device has a lower uplink path loss towards the strong cell than towards the weak cell; instructing the strong cell to transfer a second grant for the uplink to the weak cell, if the strong cell is detected; instructing the weak cell to provide a first grant based on the second grant to the first user device, if the strong cell is detected.

The method according to any of the eighteenth and nineteenth aspects may further comprise instructing the weak cell to maintain serving the downlink if the strong cell is detected.

In the method according to any of the eighteenth and nineteenth aspects, the detecting may comprise detecting the strong cell if a message is received from the weak cell, wherein the message may indicate that the first user device does not react to a third grant provided by the weak cell for the uplink.

In the method according to any of the eighteenth and nineteenth aspects, the detecting may comprise detecting the strong cell if it is detected that an active set of the first user device contains the weak cell and the strong cell, wherein a power of a first primary common pilot channel from the weak cell to the first user device may be different from a power of a second primary common pilot channel from the strong cell to the first user device.

In the method according to any of the eighteenth and nineteenth aspects, the detecting may comprise detecting the strong cell if it is detected that an uplink throughput of a second user device different from the first user device is below an uplink throughput threshold.

In the method according to any of the eighteenth and nineteenth aspects, the first grant may comprise at least one of a power control to increase a power on the uplink, an absolute power control to set the power on the uplink, and a data rate control to set the data rate on the uplink.

According to a twentieth aspect of the invention, there is provided a method, comprising monitoring if a preventing command to prevent providing a first grant for an uplink of a first user device is received; preventing the providing of the first grant if the preventing command is received.

According to a twenty-first aspect of the invention, there is provided a method, comprising monitoring if a transfer command to use a second grant for an uplink of a first user device is received, wherein the second grant is received from a base station device different from an apparatus performing the method; providing a first grant based on the second grant to the first user device.

The method may further comprise calculating a calculated grant for the uplink; preventing providing the calculated grant to the first user device if the transfer command is received.

The method according to any of twentieth and twenty-first aspects may further comprise detecting that the first user device does not react to a third grant for the uplink provided by the method to the first user device; providing, if it is detected that the first user device does not react, a stuck indication message to a first control device different from an apparatus performing the method.

The method according to any of twentieth and twenty-first aspects may further comprise detecting that an uplink throughput of a second user device different from the first user device is below an uplink throughput threshold; providing, if it is detected that the uplink throughput is below the threshold, a throughput indication message to a second control device different from an apparatus performing the method.

In the method according to any of twentieth and twenty-first aspects, the first grant may comprise at least one of a power control to increase a power on the uplink, an absolute power control to set the power on the uplink, and a data rate control to set the data rate on the uplink.

According to a twenty-second aspect of the invention, there is provided a method, comprising monitoring if a separating message indicating a separation of an uplink grant for an uplink of a user device and a serving downlink serving the user device is received; providing, if the separating message is received, the uplink grant for the uplink of the user device.

The method may further comprise preventing prevent, if the separating message is received, providing a downlink grant for a downlink from an apparatus performing the method to the user device.

According to a twenty-third aspect of the invention, there is provided a method, comprising monitoring if a separating message indicating a separation of an uplink grant for an uplink of a user device and a serving downlink serving the user device is received; calculating the uplink grant for the uplink; transferring, if the separating message is received, the calculated uplink grant to a base station device different from the user device.

The method may further comprise preventing, if the separating message is received, providing the calculated uplink grant to the user device.

In the method according to any of the twenty-second and twenty-third aspects, the uplink grant may comprise at least one of a power control to increase a power on the uplink, an absolute power control to set the power on the uplink, and a data rate control to set the data rate on the uplink.

According to a twenty-fourth aspect of the invention, there is provided a method, comprising being served on a downlink by a weak cell, wherein the serving on the downlink is based on a schedule received from the weak cell; controlling at least one of a transmission power and a data rate of an uplink of an apparatus performing the method based on a grant received from a strong cell different from the weak cell.

The method may further comprise monitoring if a separating message is received, wherein the separating message indicates that the at least one of the transmission power and the data rate of the uplink is based on the grant received from the strong cell; and wherein the controlling may comprise controlling the at least one of the transmission power and the data rate only if the separating message is received.

In the method, the grant may comprise at least one of a power control to increase a power on the uplink, an absolute power control to set the power on the uplink, and a data rate control to set the data rate on the uplink.

The method of any of the eighteenth to twenty-fourth aspects may be a method of uplink control.

According to a twenty-fifth aspect of the invention, there is provided a computer program product comprising a set of instructions which, when executed on an apparatus, is configured to cause the apparatus to carry out the method according to any one of the eighteenth to twenty-fourth aspects. The computer program product may be embodied as a computer-readable medium.

According to embodiments of the invention, at least one of the following advantages is achieved:

The UL capacity may be increased;
RoT noise at neighboring cells may be decreased;
UE power consumption may be decreased;
HSUPA scheduling failures may be reduced;
The UE is served by the best uplink and the best downlink;
The success rate of handovers and serving cell changes in Hetnet environment is increased;
2 msec TTI may be used at best uplink;
The probability of reaching UE UL peak rate is increased; and
The solution may be backwards compatible for the UE.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Figure 1:
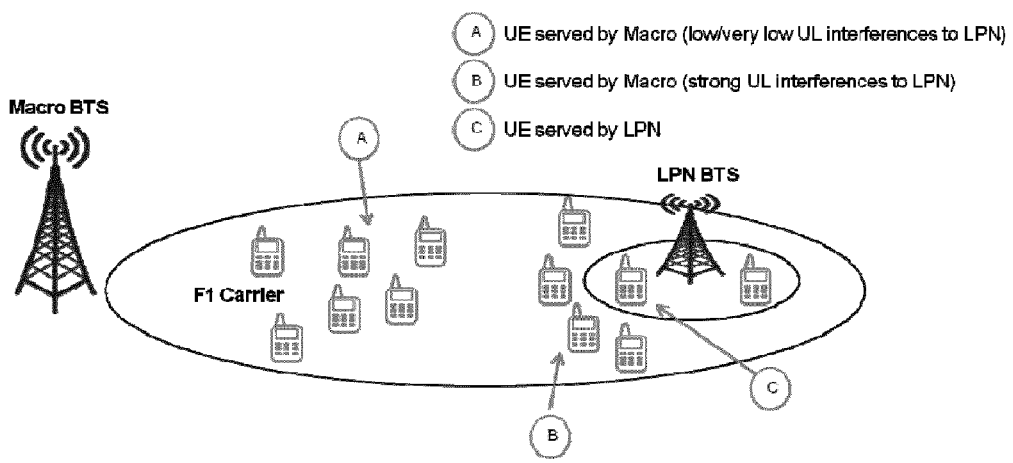
FIG. 1 shows an exemplary HetNet deployment.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

The link imbalance is defined as a phenomenon where DL and UL coverage areas from two different nodes are not matched. The serving node is determined based on the strongest downlink power at the UE. In a link imbalance, uplink to a first node (not strongest in downlink) is strong and to a second node different from the first node is weak, whereas downlink from the first node is weak and downlink from the second node is strong. In the following, the first node is also named strong node (strong cell etc.), and the second node is also named weak node (weak cell etc.), based on the respective powers received on the uplink. More specifically, the uplink path loss to the strong node is lower than that to the weak node. In some embodiments, a certain offset may be used such that the uplink path loss to the strong node has to be lower by this offset than that to the weak node.

In a link imbalance situation, the node that has the weaker pilot power on the downlink always dominates the UL power control loop when a UE is in SHO with these nodes because, if the UE receives both power up commands from the weak node and power down commands from the strong node, it will follow the power down commands. The reason is that UE always decreases it's UL power. I.e., the weak node uplink power control (UL PC) loop will be overruled by the strong node UL PC, i.e. UE always obeys PC commands from strong node.

In the following, a description of the relevant channels and signaling according to 3GPP standards is given. However, the invention is not limited to the 3GPP standard, and may be realized according to different standards, too.

Conventionally, if the UE is served by the macro cell by HSDPA (on the downlink), the macro cell is also the serving cell for E-DCH or DCH (on the uplink). On the physical layer, E-DPCCH is used to carry the control information of the E-DCH, UL DPCCH (or DL DPCCH or F-DPCH) is used to carry the control information of the DCH (when DCH is also allocated alongside E-DCH to the UE). From the UE transmit perspective, on the DPCCH, at least one of the following information is transported from the UE to the cell: power control commands (TPC), Transport Format Combination Indicator (TFCI) indicating the format by which the UE transmits data, pilot bits allowing the cell to estimate the channel, and feedback information to allow the cell to control diversity. On the physical layer, data are transported on DPDCH or E-DPDCH, respectively. The E-DCH consists of E-DPDCH and E-DPCCH. The E-DPCCH is used for transmitting information about the E-DPDCH from the mobile to the base station. The E-DPCCH carries E-TFCI, RSN (HARQ retransmission sequence number), but also a "happy bit". The happy bit is a means for the UE to inform the NodeB about the amount of data it has in its buffer relative to the scheduling grants that it has received from the NodeB. It thus helps the NodeB to carry out the UL scheduling. The UE informs the NodeB about its buffer status also with a SI (scheduling information) indicator, which is carried in MAC-e PDUs, which are carried over E-DPDCH.

For the operation of E-DCH additionally the following channels on the physical layer are required: From the serving E-DCH node: E-AGCH (Absolute Grant Channel); from the serving and non-serving E-DCH nodes: E-RGCH (Relative Grant Channel), F-DPCH (Fractional-DPCH), and E-HICH (E-DCH Hybrid ARQ Indicator Channel).

Conventionally, when the UE has a few cells in its active set (e.g. during SHO), the behavior is:

- The UE will follow the UL power control algorithm as described, independent of which cell is transmitting the E-AGCH (absolute grant channel).
- The E-AGCH sets an UL power grant, but this is independent of the UL power control SIR target as such (typically, there is some logical connection between the two)
- The relative grant channels (E-RGCH) can be issued by any cell in the AS, also by the cell which owns the E-AGCH.
- A cell that belongs to the same BTS as the one that has cell which transmits the E-AGCH may issue a positive E-RGCH relative grant, otherwise it may issue only a negative one.

E-RGCH or E-AGCH cannot be sent from a cell that is not in the active set.

Conventionally, a cell serves an uplink of a UE, if it evaluates all the data transported on the E-DCH or DCH, respectively.

Hereinafter, DCH/DPCCH and E-DCH/E-DPCCH are used one representing the other, too, except if stated differently or clear from the context.

Figure 2:
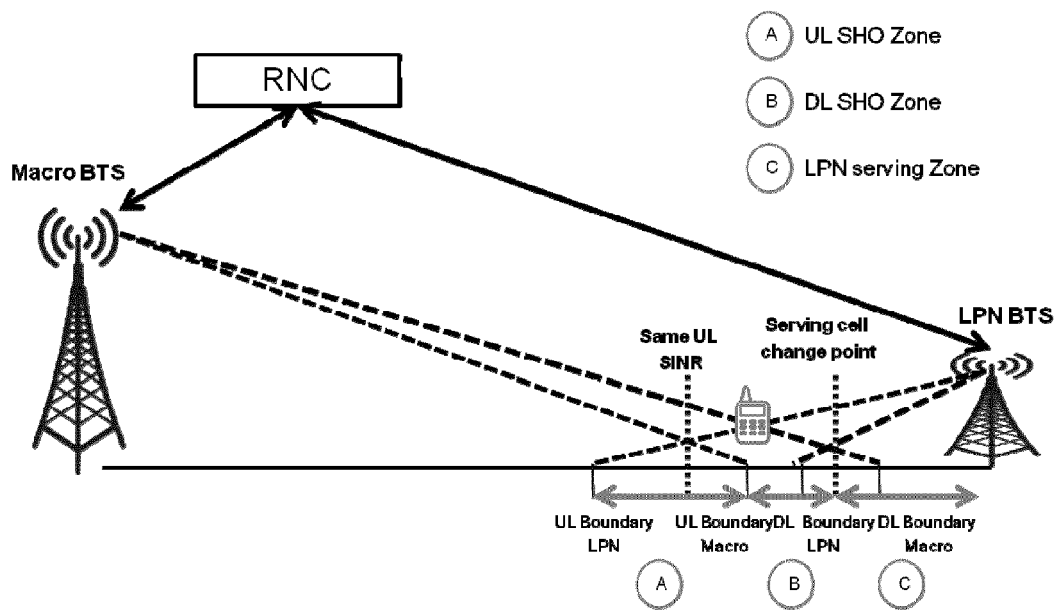
FIG. 2 shows a pictorial representation of UL/DL signal strength zones in a HetNet deployment.

In FIG. 2, the path between macro and LPN BTS (e.g. pico BTS), is divided into several zones. In FIG. 2, it is assumed that the received UL/DL signal strength decreases linearly with the distance from the respective base station. However, linear decrease is only exemplarily and not limiting. In FIG. 2, DL coverage (thick dashed lines) of the macro BTS extends slightly larger than uplink coverage (thin dashed lines), but this is exemplarily only too. DL coverage of the small cell is much less than its UL coverage. No coverage means that the respective received power is below a certain threshold value.

The arrows at the bottom indicate zones at the boundary area between macro BTS and small BTS:

In zone A (UL SHO zone), downlink of the macro BTS is stronger than downlink of LPN BTS. The UE is served by macro BTS. On the left side of zone A, UL to macro BTS is stronger than UL to LPN BTS, whereas this is different on the right side. The point with equal uplink SINR is marked by "same UL SINR".

In zone B, the SINR of the UL to macro BTS becomes very small (below a threshold), but DL of the macro BTS is still higher than that of the LPN BTS. In this zone, conventional (DL) SHO may take place.

In zone C, uplink and downlink of the LPN are stronger than those of the macro BTS. The UE is served by the LPN BTS.

A UE which is approaching another cell and entering the DL SHO zone is likely to be configured by the RNC to add the other cell to its "active set". Once the other cell has been added to the active set the UE can be said to be in SHO with the other cell. The addition of the other cell to the active set of the UE means that at least a DL DPCCH or F-DPCH from the other cell to the UE is established, which the UE is listening to.

In DCH, the UE may be receiving data from both cells when in SHO. In detail, in HSDPA without multiflow, the UE may be receiving data only from the serving cell when in SHO. In HSDPA with multiflow the UE may be receiving data from both cells. In UL, when in SHO, both nodes will be receiving data from the UE, and macro combining of the data will take place at the RNC.

The uplink propagation path of a signal to macro cell BTS and small cell BTS have very different link budget losses and gains characteristics. E.g. if the UE moves towards small cell BTS, the uplink path loss to small cell decreases quite rapidly compared to the uplink path loss to the macro cell (e.g. every 40 meter the signal at the small cell BTS becomes stronger by 5 dB, and at the macro cell BTS, it becomes weaker by 1 dB only). This is because of differences in fundamental parameters that affect the link budget, such as:

1. Macro and small cell BTS antenna height
2. Macro and small cell BTS antenna gain
3. Macro and small cell BTS receiver noise figure Since the uplink signal to small cell is quite strong (high DPCH level at small cell), the inner loop power control is guided by small cell in SHO regime (i.e. if the UE is in SHO zone). That is, in the SHO zone, the small cell (pico cell, also named low power node (LPN) in view of its low transmit power) is the strong cell, and the large cell (macro cell) is the weak cell, in the terms as defined as defined hereinabove.

By inner loop power control, the UE transmitter adjusts its output power in accordance with one or more Transmit Power Control commands received from the BTS, in order to keep the uplink SIR at the base station at a given target. The base station (cell) estimates SIR of the received DPCH and generates corresponding TPC commands. The inner loop power control commands are carried e.g. over the F-DPCH.

The asymmetry in UL and DL SHO boundaries leads to a multitude of problems. For example:

Problem 1: The UL Capacity of the Strong Node may be Decreased, RoT Noise of the Strong Mode may be Increased, and UE Power Consumption may be Increased When UL SIR target is, e.g. purposely, kept higher in strong node (either as part of regular implementation or because interference cancellation is active at stronger node; this is to improve HS-DPCCH reception towards the weak node), this causes that UL DPCCH at weak node also to be boosted and all associated uplink channels also will be boosted at weak node as well (since they are offset by DPCCH power). However, such a boosting is a waste of system resources from UE power and UL interference perspective because the quality of reception of those uplink channels (e.g. E-DPCCH, E-DPDCH) would never be at par with the strong node. Additionally, the strong node gets more E-DCH power for satisfying its BLER targets (and pushing UL power control to reduce the UL DPCCH from the UE if UE is in its active set). If E-DPCCH and E-DPCCH power offsets are not reconfigured, then the UE ends up transmitting a higher power than necessary for the UL to the strong node, creating also more UL interference to neighbouring cells (other macro cells+LPN). Accordingly, the system UL capacity is decreased, and RoT may be increased at the neighbouring cells. This interference should be avoided as much as possible.

This problem occurs in particular, if the strong node is not in the active set of the UE, i.e. if the UE is not in SHO zone.

Problem 2: HSUPA Scheduling Failure at Weaker Upline (if it is also E-DCH Serving Cell)

It is shown that the Macro uplink, in the SHO zone, will not be able to decode E-DCH channels properly at all (3GPP R1-130621: Robust UL Control Channel Reception for Heterogeneous Networks/Ericsson, ST-Ericsson 3GPP TSG RAN WG1 Meeting #72).

Problem 3: The UE is not Served by the Best Uplink and the Best Downlink at SHO Boundaries In a Hetnet environment, the UL SHO boundary precedes the DL SHO boundary when observed from the macro BTS to the small BTS. However, conventionally, the RNC does not add the strong node to the active set because the DL from strong node is quite weak. Additionally, the strong node will start dominating the UL power control quite early when approaching to it and this will make the situation worse. In the UL SHO area, the UE is an interferer to uplink to the strong cell.

Problem 4: The Success Rate of Handovers and Serving Cell Changes in Hetnet Environment is Reduced The probability of getting both UL&DL resources in a single node is lower than if requests for UL resources and DL resources are split to 2 different nodes.

Problem 5: Cannot Use 2 msec TTI at Best Uplink

The weak uplink will force 10 msec TTI on E-DCH to improve UL coverage. Thus, 2 msec TTI cannot be allocated at uplink to the strong node. It is well known that 2 msec TTI not only improves UL TTI utilization by better scheduling efficiency but is also a way to increase peak rate of the UL channel and to increase UL capacity.

Embodiments of the invention seek to avoid some of the problems by introducing more separate handling of UL and DL transmissions compared to legacy procedures. That is, according to these embodiments, the UL is decoupled from the DL serving cell. More in detail, in a HetNet environment, the UL may be switched to the small cell while retaining the macro cell as serving cell in DL.

Generally, a link imbalance situation may be characterized such that an uplink transmission by the UE on the uplink is received at the weak cell with a lower level than at a strong cell different from the weak cell, whereas a first downlink transmission on a first downlink from the weak cell is received at the UE at a higher level than a corresponding second downlink transmission by the strong cell on a second downlink. Since handover will be triggered based on downlink signal, the UE in such a situation is conventionally served by the weak cell.

According to embodiments of the invention, the following steps are performed per UE:

1. The first step is for the RAN (e.g. RNC, eNodeB) to realize that there is a potential link imbalance situation. Some potential triggers are listed below, but this list is not exhaustive. The triggers may be used solely or combined with each other.
   a. One trigger for realizing a potential link imbalance situation is that the weak node (BTS, cell) sends a notice to the RNC that the ILPC is stuck, i.e. the UL SINR is not changing even after weak node is attempting to send continuous commands to increase its uplink power to UE, such as "1" in DL DPCCH/F-DPCH channels. This could also be interpreted as weak node BTS being unable to keep the UL SIR target commanded by the RNC via OLPC.
   b. Another trigger for realizing a potential link imbalance situation is available during intra frequency handover, i.e. when active set of UE is containing 2 nodes. If they have different DL P-CPICH powers, RNC may assume a link imbalance scenario. The RNC may additionally determine the link imbalance with knowledge of UL receiver variables (equalizer gain, noise rise, noise figure, interference cancellation gains etc.) in the strong and weak nodes, respectively.
   c. Yet another trigger is UL load increase of the weaker cell by UEs served by the weaker cell, although they do not have the expected UL throughput but stronger non-serving node reports better throughput (e.g., this may be known from too many HARQ retransmissions from E-DCH frame).

2. RNC RRM takes a decision to decouple the UL of the UE to the strong node. E.g., the decision may be based on checks of the loads of the ULs of the weak node and the strong node. In some embodiments, no additional check is performed after the link imbalance situation is detected.

3. RNC activates the decoupling of UL and DL SCC through one of the following alternatives:
   a. An E-DCH SCC is performed by consecutive Active Set Update and RRC Reconfiguration message (Radio Bearer/Transport Channel/Physical Channel). E-DCH SCC is a partial SCC, i.e. only performing E-DCH transfer. As part of this E-DCH transfer the strong node may send the E-AGCH.
   b. Combined Active Set Update+E-DCH Serving Cell Change. Again, E-DCH SCC is partial SCC. The UE may be informed by enhancing a corresponding Re16 procedure.
   c. An E-DCH SCC is performed by HS-SCCH orders (when Target cell uplink configuration is already known to UE).

Steps 3a, 3b and 3c list some signalling options. However, this list is not exhaustive, and the decoupling may be performed by other signalling flows, too.

It should be understood that a scheduling grant to the UE in effect is a transmit power allocation.

Note that some power control of uplink channels remains at the weak node. Namely the E-DCH PC is decoupled from the HS-DPCCH and UL DPCCH power levels. These channels are still relevant for the weaker node. That is, separate PC loops are applied to maintain HS-DPCCH/UL DPCCH and E-DCH power levels, respectively.

According to other embodiments of the invention, the decoupling is achieved in that the E-AGCH remains at the weak cell, and the weak cell retains formally the role of serving cell also for E-DCH. However, the weak cell gives grants for UL scheduling in accordance with information received from the weak node, e.g. information related to the free UL capacity of the strong node. In this case, the strong node informs the weak node e.g. via the RNC about the SI information that it has been receiving from the UE, or cumulative happy bits.

In some embodiments, the weak node gives maximum grants to the UE. This gives the strong node the opportunity to limit the actual transmissions by the UE with the E-RGCH. Also the weak node can limit the transmissions later if it turns out the strong node is limiting UL transmissions more than it anticipated, or if it turns out that the UE's contribution to the weak node's NR is too high.

In some embodiments, as the weak node needs to balance the noise rise (NR) budget available in UL among the UEs in the cell, the strong node may inform the macro via the RNC about the grant that it will allocate to the UE, such that no later reduction needs to be performed by the strong node.

It is noted that the methods of these embodiments, where E-AGCH remains within the weak node, are transparent to the UE, and hence applicable to legacy UEs. New signalling is introduced from the strong node to the weak node informing the weak node about the scheduling grant.

The behavior according to some embodiments of the invention may also be described as follows: The LPN assumes the role of scheduling the UL, but does so through the macro as a proxy. In particular, the LPN computes the UL scheduling grant, and relays the grant to the macro. It may relay the grant to the macro via the RNC through NBAP messages. It may also relay the grant to the macro through a direct interface. The macro issues the grant (or a grant based on the received grant) to the UE via legacy procedures, i.e. through the E-AGCH.

The UE continues to transmit UL scheduling related information such as SI and happy bit. The macro may act directly on those, or wait for further grant information to be relayed from the LPN. If the macro is to act directly on new SI information received by the UE, the RNC will configure the UE to boost SI or other UL scheduling information related signals by means of legacy procedures. It should be appreciated that the RNC can also inform the LPN about which UE it should be giving the UL grants to.

For the embodiments, where the E-AGCH remains within the weak node, and the UL to the weak node is weak, the weak node may still receive the SI, as the SI can be boosted separately. Alternatively the SI part can be relayed from the strong node to the weak node through the network (e.g. via RNC). That is, alternatively to separate PC loops, selective boosting of relative control channels may be applied, namely the HS-DPCCH, and SI part of the E-DPDCH.

Embodiments of the invention solve the above listed problems as follows:

Problem 1: The UL Capacity may be Decreased, RoT Noise may be Increased, and UE Power Consumption may be Increased Solution: according to embodiments of the invention the E-DCH is now solely served by the strong node.

Main benefit: UL capacity increase; reduce RoT because E-DCH overhead at macro cell and other LPNs is avoided.

Problem 2: HSUPA Scheduling Failure at Weaker Uplink (if it is also E-DCH Serving Cell)

Solution: According to embodiments of the invention, the weak node (the macro cell) no longer needs to decode E-DCH relevant channels beyond legacy procedures. That is, the weak node need not to decode UL E-DPCCH and UL E-DPDCH. For instance, if the weak node is in the active set, it may still be entitled to send E-RGCH grants to the UE.

Hence the scheduling of the uplink is transferred to the strong node currently dominating the uplink so that the control channels needed for E-DCH operation are decoded well. In particular, the strong node has the ability to control the E-AGCH, or the network may be configured such that the strong node carries out functions corresponding to that of the E-AGCH.

Main benefit: UL throughput drop is prevented; unnecessary HARQ retransmissions from UE are avoided. With this invention HSUPA scheduling is transferred to the strong node dominating the UL. Furthermore, the weak node does not need to allocate RoT budget for the UE and thus waste macro UL capacity.

Problem 3: The UE is not Served by the Best Uplink and the Best Downlink at SHO Boundaries Solution: According to embodiments of the invention, the UE will be served in DL by the stronger DL, and in UL by the stronger UL.

Main benefit: This exploits the fact that in a HetNet environment, there are more than 1 potential UL paths possible to a UE which may be congestion free. Embodiments of the invention have an intermediate step of partial SCC compared to a full SCC. A macro transmitting node always dominates DL to the UE whereas the LPN receiving node dominates the UL to the UE (because UE is power limited in UL).

This is in particular beneficial if the UE is not in SHO with weak cell and strong cell.

In some cases, the UL of the weak cell is already under heavy load. According to embodiments of the invention, the UL is offloaded from the weak cell to the strong cell. This improves the overall system uplink capacity and also reduces the noise rise burden on the strong cell by eliminating dominant interfering UE in UL that was being served by the weak cell.

Problem 4: The Success Rate of Handovers and Serving Cell Changes in Hetnet Environment is Reduced Solution: According to embodiments of the invention, the UE will be served in DL by the stronger DL, and in UL by the stronger UL Main benefit: The benefit may be seen from an example: If a probability to get an UL resource in each node is 50%, and a probability to get a downlink resource in each node is 50%, the chance to acquire an UL resource only is 50% higher than acquiring both a UL resource and a DL resource. This creates an intermediate step of partial SCC compared to a full SCC.

Problem 5: Cannot Use 2 msec TTI at Best Uplink

Solution: E-DCH is served only by strong UL.

Main benefit: UL capacity increase; 2 msec TTI can be safely allocated from strong UL.

The above problems/solutions/benefits apply to legacy HSPA users (i.e. UEs without multiflow capability such as UEs of releases before Rel 11), as well as to Single Frequency and Dual Frequency multiflow-capable UEs (Rel 11 onwards). The following two beneficial scenarios are applicable to multiflow UEs only:

Scenario 1: Optimizing UE Uplink Only to Cater to Multiflow Transmission

The weak node radio link is required to be kept only for the Multiflow case (requirement to receive UL HS-DPCCH for downlink transmission from weak node).

Scenario 2: Keeping Macro as Primary Serving Cell for Multiflow Transmission

In Multiflow scenario, it is desirable to keep Macro node as the Primary Serving Cell and switch small nodes (pico nodes etc.) as and when they are reported by the UE. It is understood that the procedure for switching the UL only to the small node compared to switching both the UL and DL to the small node is faster. Also UL to macro node may be resumed as soon as UE reports the small node being out of active set.

Embodiments of the invention may be employed e.g. according to the following implementations. Several architectural frameworks for Iub deployment may be used (Iub designates the interface between RNC and NodeB).

Figure 3:
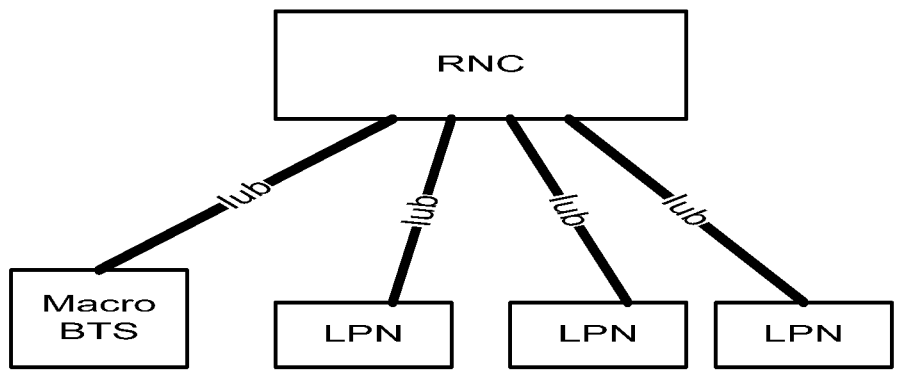
FIG. 3 shows a first Iub architecture on which embodiments of the invention are applicable.
Figure 4:
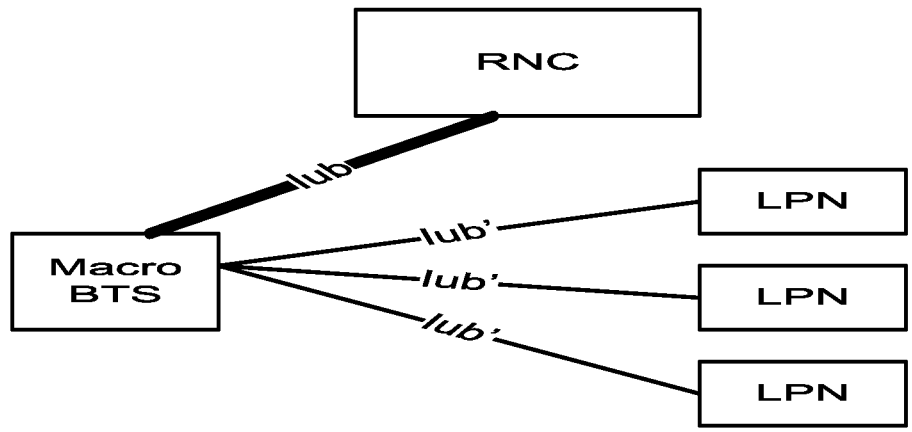
FIG. 4 shows a second Iub architecture on which embodiments of the invention are applicable.

The RNC may be connected to all BTS directly via Iub interface (FIG. 3), the RNC may be connected to macro BTS directly via Iub interface, and indirectly—through macro BTS—to the small BTS (FIG. 4). In this case, macro BTS routes IUB to small cells. The RNC may be connected to a baseband pool hosting both macro BTS and small cell (FIG. 4).

Figure 5:
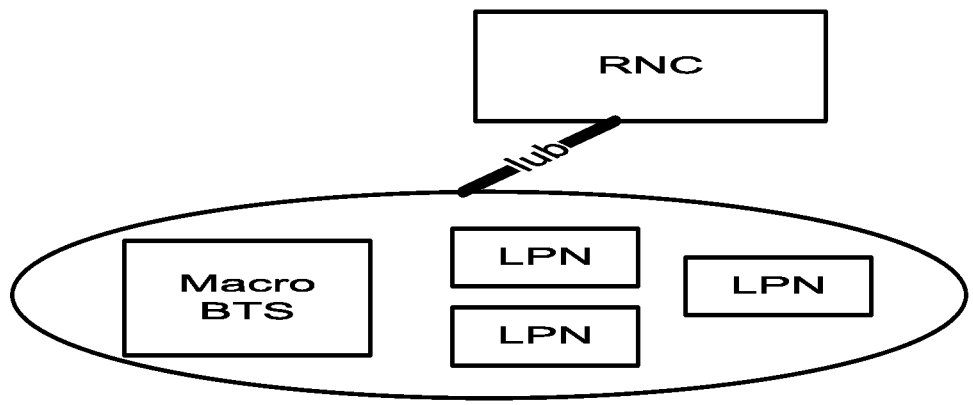
FIG. 5 shows a third Iub architecture on which embodiments of the invention are applicable.

Embodiments of the invention work independently from the chosen Iub architecture, except that the amount of message is reduced from the architecture of FIG. 3 to that of FIG. 5.

Figure 6:
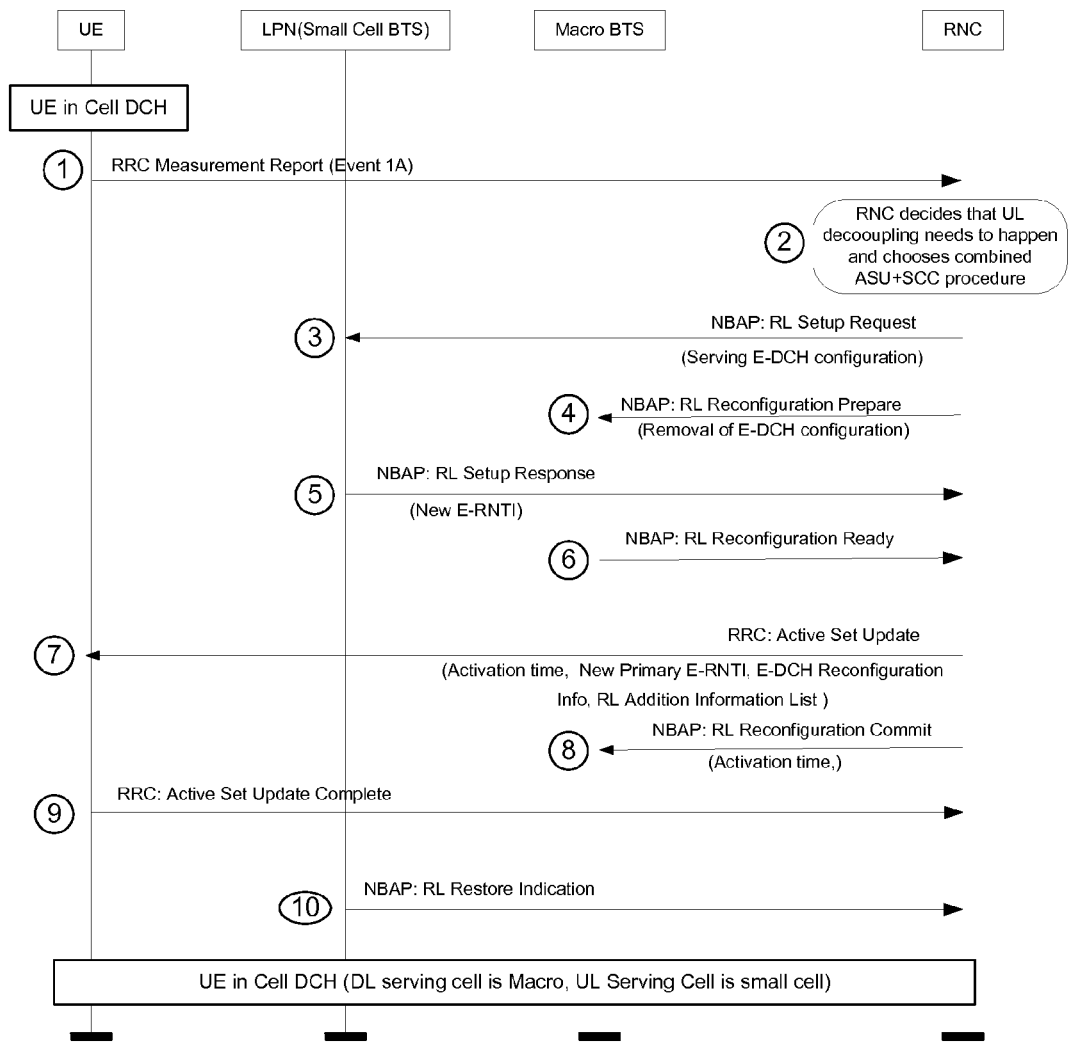
FIG. 6 shows a first message flow according to an embodiment of the invention.
Figure 7:
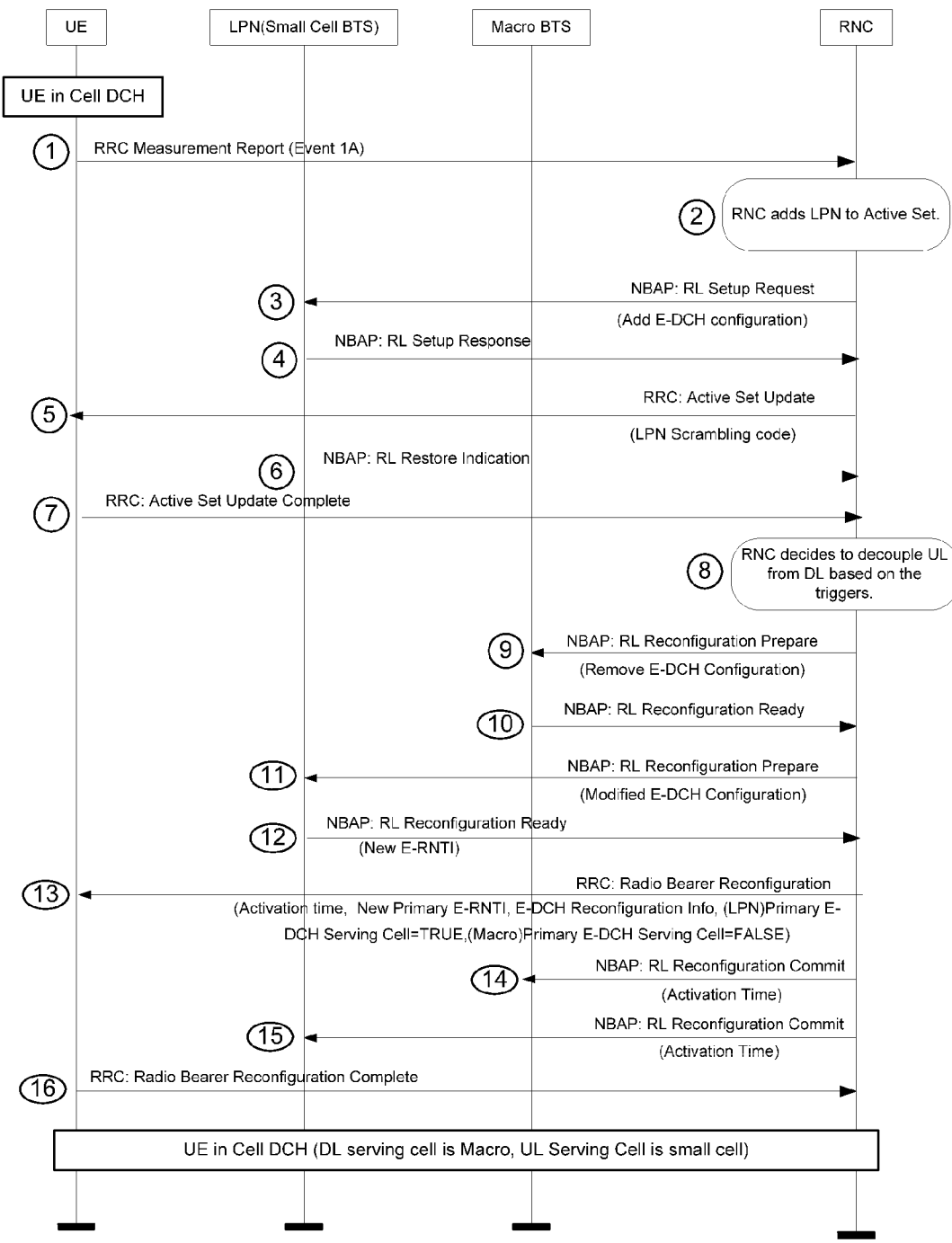
FIG. 7 shows a second message flow according to an embodiment of the invention.
Figure 8:
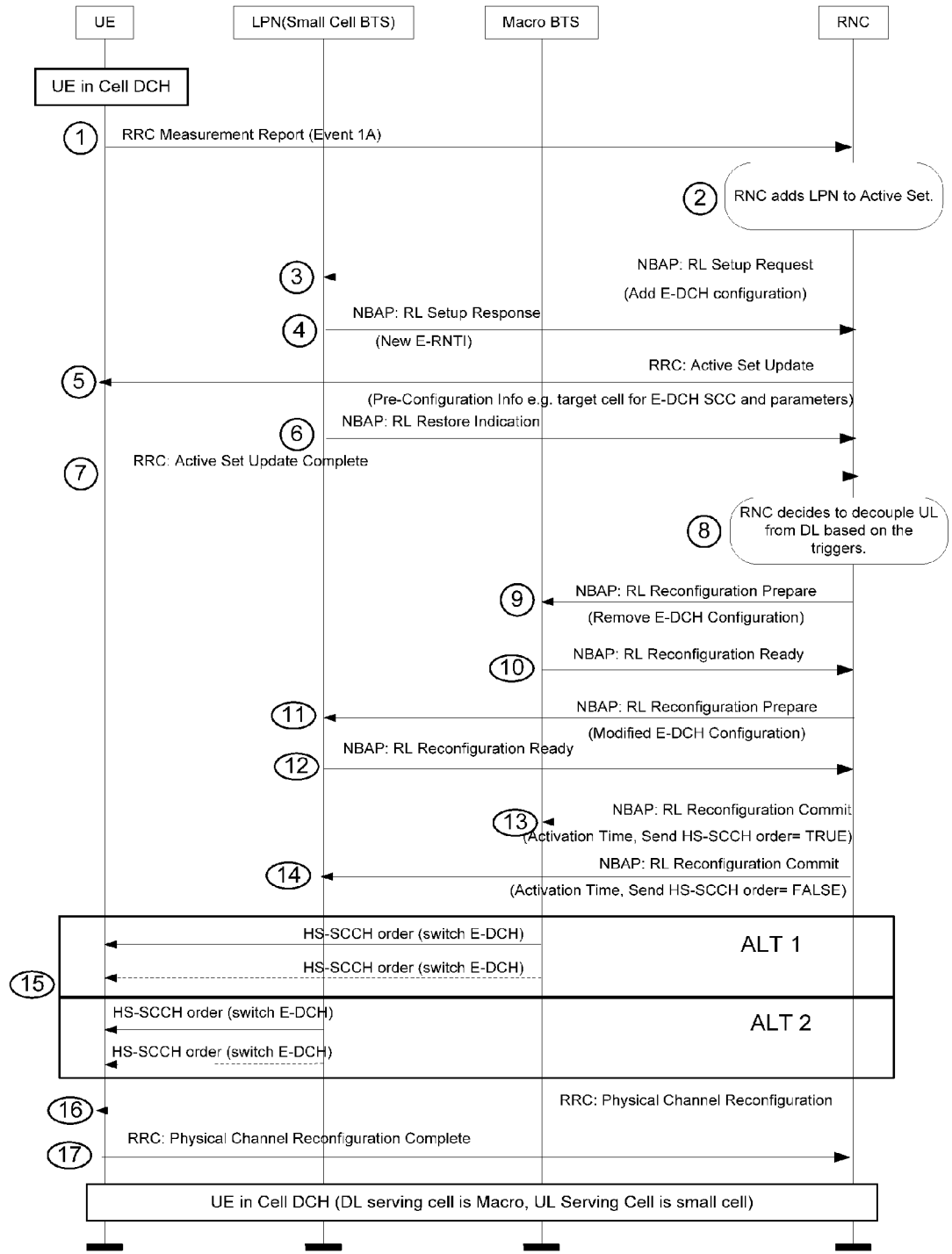
FIG. 8 shows a third message flow according to an embodiment of the invention.

FIGS. 6 to 8 show message flows according to embodiments of the invention. Only the messages relevant for the present invention are shown. LPN means "Low Power Node" and is considered to be the strong node, i.e. the node to which the uplink is stronger than to the macro BTS (weak node).

FIG. 6 shows a message flow realizing steps 1.a (step 1 in FIG. 6) and 3.a of the above steps.

After the link imbalance situation is detected due to the RRC measurement report in step 1 and the RNC decided to perform the decoupling (step 2), the RNC requests a new serving E-DCH configuration from the LPN (small cell) in step 3. In reply, the small cell provides in step 5 a new E-RNTI. In parallel, RNC instructs macro BTS to prepare the removal of the E-DCH configuration from the macro BTS (step 4), which preparation is confirmed by the macro BTS in step 6, and in step 8, the RNC instructs the removal of E-DCH from the macro BTS. In parallel to step 8, the RNC sends an active set update message to the UE, which comprises E-DCH reconfiguration information for the new primary E-RNTI, i.e. related to the LPN. Messages 7 and 8 comprise the same activation time, when the modifications are performed in macro BTS and UE. By message 9, UE confirms completion of the active set update. In step 10, the UE synchronizes with LPN uplink and this is reported to RNC via. the corresponding NBAP: RL Restore Indication message.

All the messages sent to UE are conventionally known except that ASU message carries a partial SCC command (and corresponding IEs only will be passed by RNC to the UE). A partial SCC command means that only E-DCH is configured for the new E-RNTI and removed from the old E-RNTI.

The message flow of FIG. 6 cannot be used if E-DCH was reconfigured, e.g. by TTI switching etc. At least in this case, embodiments of the invention may use the message flow of FIG. 7 or include RRC Reconfiguration messages for Radio Bearer/Transport Channel/Physical Channel into the message flow of FIG. 7. The message flow of FIG. 7 may be used also if E-DCH was not reconfigured. Preferably, the message flow of FIG. 7 is applied when radio link parameters undergo a change e.g. a change of power offsets or E-DCH TTI etc. The message flow of FIG. 7 corresponds to step 3.b hereinabove.

In step 1 of FIG. 7, the potential link imbalance situation is detected. In step 2, LPN is added by the RNC to the active set. In steps 3 and 4, the E-DCH configuration parameters are added to the radio link configuration of the LPN. In step 6, the UE synchronizes with LPN uplink and this is reported to RNC via. the corresponding NBAP: RL Restore Indication message. In steps 5 and 7, UE's active set is updated with the LPN's scrambling code. Steps 1 to 7 may be performed before or after RNC decides to decouple UL from DL (step 8).

Steps 9 and 10 of FIG. 7 correspond to steps 4 and 6 of FIG. 6, through which macro BTS is prepared to remove E-DCH from its radio configuration. In step 11, RNC instructs LPN about the new E-DCH configuration, which replys in step 12 with a new E-RNTI. In steps 13 to 15, the reconfigurations of UE, LPN, and macro BTS are performed, which is confirmed by UE in step 16.

Yet another message flow of embodiments of the invention is shown in FIG. 8. It corresponds to step 3.c hereinabove.

Steps 1 to 4 of FIG. 8 correspond to steps 1 to 4 of FIG. 7. In step 5, the UE is informed by the RNC about the new E-DCH parameters. Steps 6 to 12 of FIG. 8 correspond to steps 6 to 12 of FIG. 7. In steps 13 and 14, LPN and macro BTS are instructed to reconfigure their radio link configurations, and one of them is additionally instructed to instruct the UE to switch from E-DCH to the macro BTS to E-DCH to the LPN. In the example of FIG. 8, macro BTS is instructed to instruct the UE, which is done in step 15. In steps 16 and 17, a physical channel reconfiguration of the UE is instructed by the RNC.

The steps shown in FIG. 8 are conceptually similar to legacy E-SCC procedure, but there are important differences:

Step 5: RNC now should target cell pre-configuration with full/partial SCC (later on the RNC can decide if it just wants to switch E-DCH or complete the legacy E-SCC by indicating this option in HS-SCCH order in Step 15). This means that UE receives new E-RNTI, H-RNTI etc. in a same way as legacy E-SCC but then, later on, RNC can confirm partial switch. Also notice that RNC is not waiting for Event 1A (step 1: measurement report from the UE) since it is not important in the context of E-DCH switching.

Step 8: RNC decides to perform the E-DCH switching to LPN. This example is partial switch.

Step 9-14: RNC informs source and target cells about the switching of E-DCH configuration. Specifically RNC is telling Macro BTS to send HS-SCCH order.

Step 15: In the shown example, macro BTS informs UE of target E-DCH switch. Since UE is monitoring both source and target cell HS-SCCH, it gets the command regardless of whether it is send by macro BTS or LPN. If the command is sent by both BTSs, reliability of HS-SCCH reception at UE is increased. The boxes "Alt 1" and "Alt 2" indicate that the commands from LPN and macro BTS may be sent in an arbitrary sequence. The dashed lines indicate potential retransmissions.

Steps 16-17: After HS-SCCH order reception, UE applies pre-configuration and sends RRC complete message to the RNC. This means that UE will get a reconfiguration message from source cell with RRC message or target cell with HS-SCCH order.

In embodiments of the invention, if a link imbalance is detected, the weak node (i.e. the one with the weaker uplink from the UE) may be prevented from providing a E-AGCH according to its own requirements even if it serves the downlink. It may either cease providing the E-AGCH (which is than done by the strong node which is the one with the stronger uplink from the UE), or it may provide an E-AGCH which is based on a power indication (e.g. a grant) received from the strong node.

If there are several strong nodes (i.e. with stronger uplink than the uplink of the serving cell), according to embodiments of the invention, it is decided which of the strong nodes becomes the node providing the grant (e.g. E-AGCH). Such decision may be met e.g. by RNC. For example, it may identify the node with the highest SINR. Alternatively, or in addition, it may consider the load of the strong nodes and select the one with the lowest load. In embodiments in which the strong node has to provide its grant to the weak node, all strong nodes may provide their grants to the weak node, and the latter may select the one with the lowest power.

Figure 9:
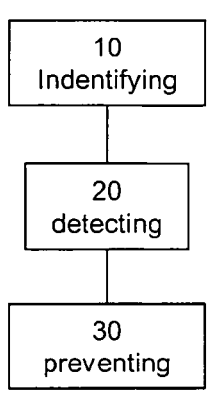
FIG. 9 shows an apparatus according to an embodiment of the invention.
Figure 10:
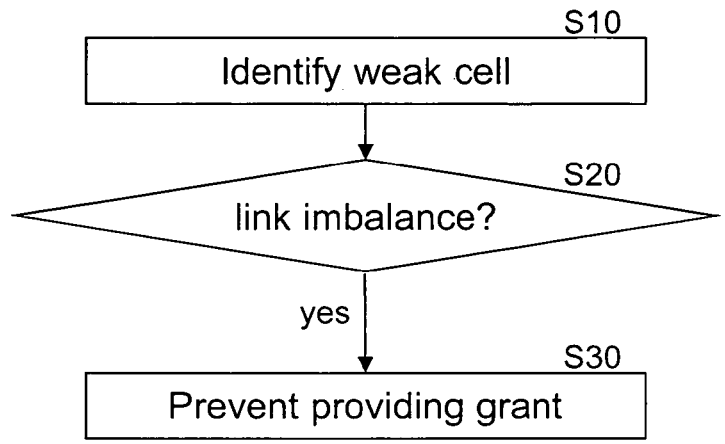
FIG. 10 shows a method according to an embodiment of the invention.

FIG. 9 shows an apparatus according to an embodiment of the invention. The apparatus may be a radio network controller such as a RNC or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises identifying means 10, detecting means 20, and preventing means 30.

The identifying means 10 identifies a weak cell serving a downlink of a first user device (S10). The detecting means 20 detects a strong cell different from the weak cell (S20), wherein an uplink of the first user device has a lower uplink path loss towards the strong cell than towards the weak cell. That is, the detecting means 120 detects a link imbalance. The preventing means 30 prevents the weak cell from providing a grant for the uplink (S30). This behavior may be not transparent to the UE.

Figure 11:
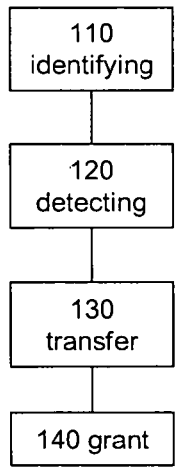
FIG. 11 shows an apparatus according to an embodiment of the invention.
Figure 12:
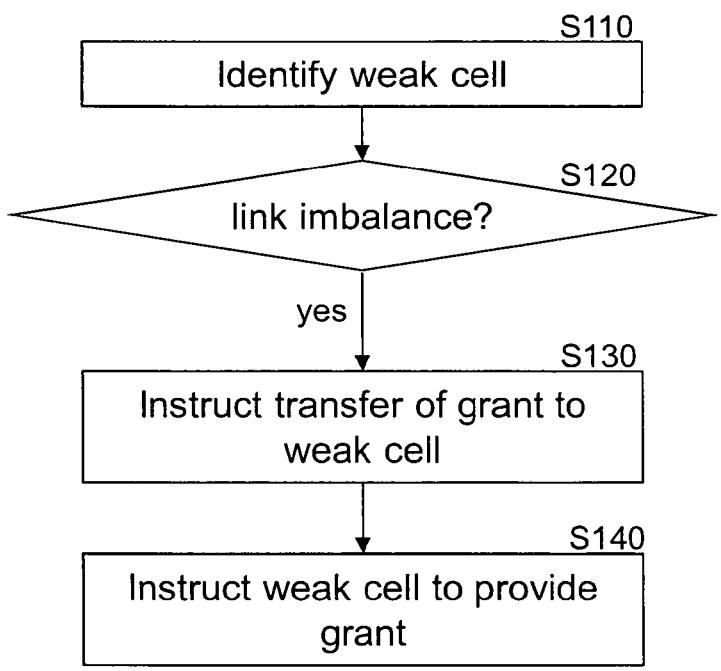
FIG. 12 shows a method according to an embodiment of the invention.

FIG. 11 shows an apparatus according to an embodiment of the invention. The apparatus may be a radio network controller such as a RNC or an element thereof. FIG. 12 shows a method according to an embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises identifying means 110, detecting means 120, transfer instructing means 130, and grant instructing means 140.

The identifying means 110 identifies a weak cell serving a downlink of a first user device (S110). The detecting means 120 detects a strong cell different from the weak cell, wherein an uplink of the first user device has a lower uplink path loss towards the strong cell than towards the weak cell (S120). That is, the detecting means 120 detects a link imbalance.

If the link imbalance is detected, the transfer instructing means 130 instructs the strong cell to transfer a second grant for the uplink to the weak cell (S130); and the grant instructing means 140 instructs the weak cell to provide a first grant based on the second grant to the first user device (S140). This behavior may be transparent to the UE.

Figure 13:
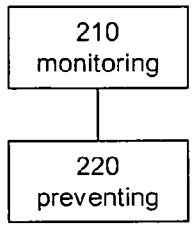
FIG. 13 shows an apparatus according to an embodiment of the invention.
Figure 14:
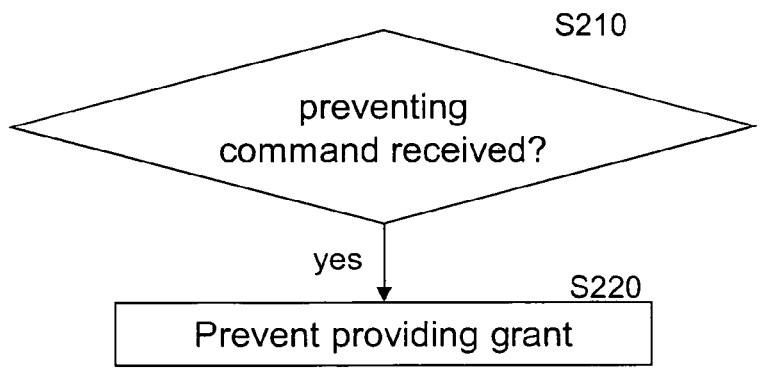
FIG. 14 shows a method according to an embodiment of the invention.

FIG. 13 shows an apparatus according to an embodiment of the invention. The apparatus may be a base station such as a NodeB or an element thereof. In particular, the apparatus may be a weak cell. FIG. 14 shows a method according to an embodiment of the invention. The apparatus according to FIG. 13 may perform the method of FIG. 13 but is not limited to this method. The method of FIG. 14 may be performed by the apparatus of FIG. 13 but is not limited to being performed by this apparatus.

The apparatus comprises monitoring means 210 and preventing means 220.

The monitoring means 210 monitors if a preventing command to prevent providing a grant for an uplink of a user device is received (S210). If the preventing command is received, the preventing means 220 prevents the providing of the grant (S220). This behavior may be not transparent to the UE.

Figure 15:
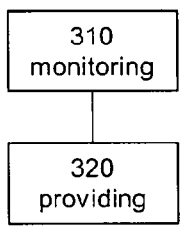
FIG. 15 shows an apparatus according to an embodiment of the invention.
Figure 16:
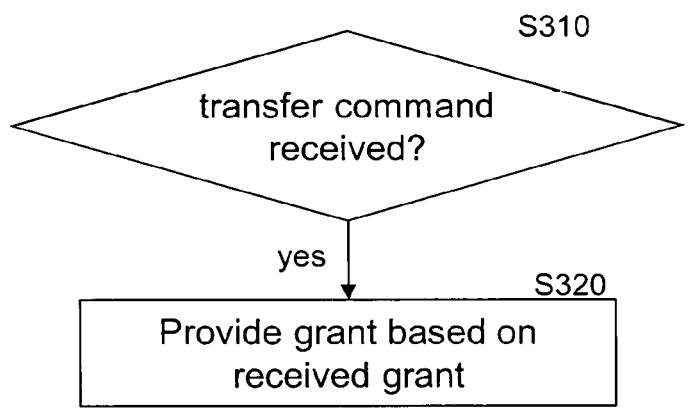
FIG. 16 shows a method according to an embodiment of the invention.

FIG. 15 shows an apparatus according to an embodiment of the invention. The apparatus may be a base station such as a NodeB or an element thereof. In particular, the apparatus may be a weak cell. FIG. 16 shows a method according to an embodiment of the invention. The apparatus according to FIG. 15 may perform the method of FIG. 16 but is not limited to this method. The method of FIG. 16 may be performed by the apparatus of FIG. 15 but is not limited to being performed by this apparatus.

The apparatus comprises monitoring means 310 and providing means 320.

The monitoring means 310 monitors if a transfer command to use a second grant for an uplink of a user device is received (S310). The second grant is received from a base station device such as a strong cell different from the apparatus. The providing means 320 provides a first grant based on the second grant to the user device (S320). This behavior may be transparent to the UE.

Figure 17:
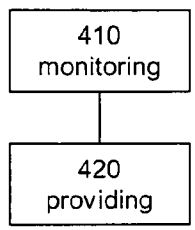
FIG. 17 shows an apparatus according to an embodiment of the invention.
Figure 18:
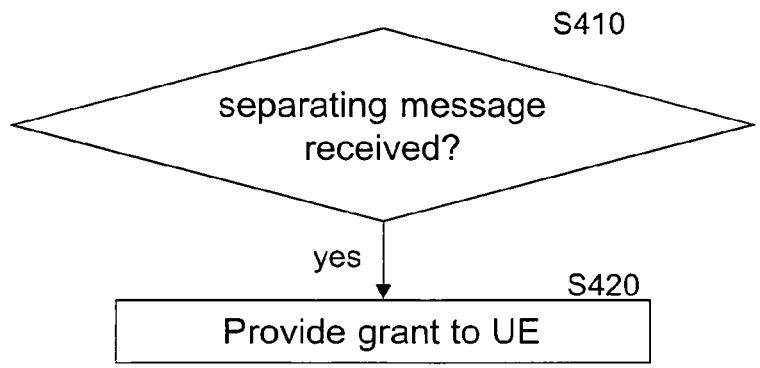
FIG. 18 shows a method according to an embodiment of the invention.

FIG. 17 shows an apparatus according to an embodiment of the invention. The apparatus may be a base station such as a NodeB or an element thereof. In particular, the apparatus may be a strong cell. FIG. 18 shows a method according to an embodiment of the invention. The apparatus according to FIG. 17 may perform the method of FIG. 18 but is not limited to this method. The method of FIG. 18 may be performed by the apparatus of FIG. 17 but is not limited to being performed by this apparatus.

The apparatus comprises monitoring means 410 and providing means 420.

The monitoring means 410 monitors if a separating message indicating a separation of an uplink grant for an uplink of a user device and a serving downlink serving the user device is received (S410). If the separating message is received, the providing means 420 provides the uplink grant for the uplink of the user device. This method may be not transparent to the UE.

Figure 19:
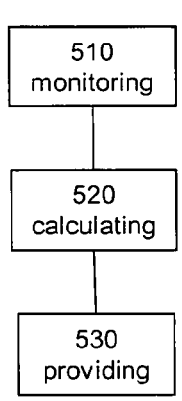
FIG. 19 shows an apparatus according to an embodiment of the invention.
Figure 20:
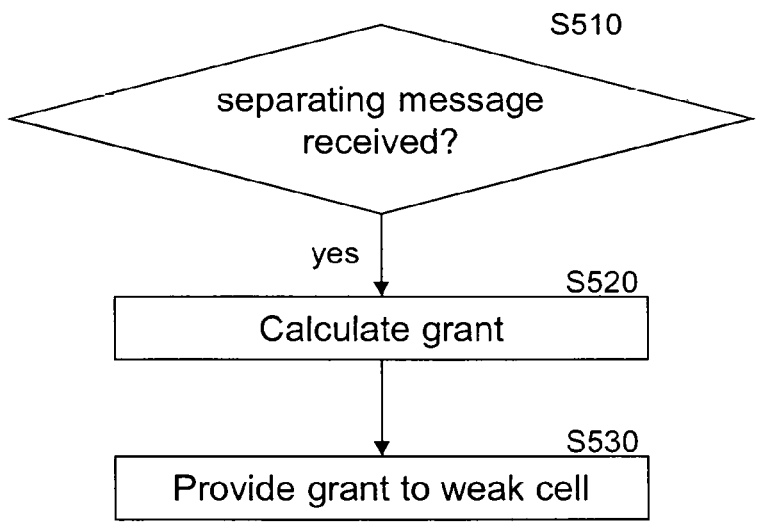
FIG. 20 shows a method according to an embodiment of the invention.

FIG. 19 shows an apparatus according to an embodiment of the invention. The apparatus may be a base station such as a NodeB or an element thereof. In particular, the apparatus may be a strong cell. FIG. 20 shows a method according to an embodiment of the invention. The apparatus according to FIG. 19 may perform the method of FIG. 20 but is not limited to this method. The method of FIG. 20 may be performed by the apparatus of FIG. 19 but is not limited to being performed by this apparatus.

The apparatus comprises monitoring means 510, calculating means 520, and providing means 530.

The monitoring means 510 monitors if a separating message indicating a separation of an uplink grant for an uplink of a user device and a serving downlink serving the user device is received (S510). The calculating means 520 calculates the uplink grant for the uplink (S520). Steps S510 and S520 may be interchanged or performed in parallel. If the separating message is received, the transferring means 530 transfers the calculated uplink grant to a base station device different from the user device (S530). This method may be transparent to the UE.

Figure 21:
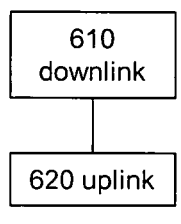
FIG. 21 shows an apparatus according to an embodiment of the invention.
Figure 22:
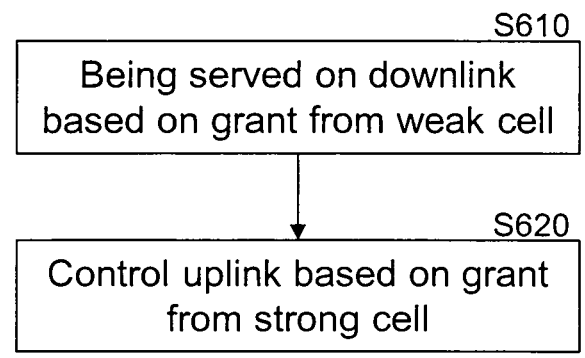
FIG. 22 shows a method according to an embodiment of the invention.

FIG. 21 shows an apparatus according to an embodiment of the invention. The apparatus may be a user device such as a UE or an element thereof. FIG. 22 shows a method according to an embodiment of the invention. The apparatus according to FIG. 21 may perform the method of FIG. 22 but is not limited to this method. The method of FIG. 22 may be performed by the apparatus of FIG. 21 but is not limited to being performed by this apparatus.

The apparatus comprises downlink means 610 and uplink control means 620.

Through the downlink means 610, the apparatus is served on a downlink by a weak cell (S610). The serving on the downlink is based on a schedule (comprising one or more grants) received from the weak cell. The uplink control means 620 controls at least one of a transmission power and a data rate of an uplink of the apparatus based on a grant received from a strong cell different from the weak cell (S620).

Instead of the 3G UMTS network (UTRAN) described hereinabove, embodiments of the invention may be employed in another heterogeneous network such as a heterogeneous LTE, CDMA, EDGE, or WiFi network. Preferably, soft handover should be employed in these networks.

Names of network elements, protocols, channels, and methods are based on current standards. In other versions or other technologies, the names of these network elements and/or protocols and/or channels and/or methods may be different, as long as they provide a corresponding functionality.

It should be appreciated that in UMTS the UL frequency is paired to the primary DL frequency. It should be understood that the invention is applicable also if the UL frequency is not paired to the DL frequency, but the UL frequency is freely chosen.

The concept above is explained for power control. However, the same concept may be applied correspondingly to data rates. Each or both of the corresponding control commands may be provided by a grant.

If not otherwise stated or otherwise made clear from the context, the statement that two entities are different means that they are differently addressed. It does not necessarily mean that they are based on different hardware. That is, each of the entities described in the present description may be based on a different hardware, or some or all of the entities may be based on the same hardware.

A terminal or an user equipment may be a mobile phone, a smart phone, a PDA, a laptop or any other terminal which may be attached to networks of the respective technologies such as LTE and UMTS or GSM. In particular, in some embodiments, the terminal or user equipment may be able to connect simultaneously to both technologies such as to LTE and UMTS or GSM.

According to the above description, it should thus be apparent that exemplary embodiments of the present invention provide, for example a storage means, or a component thereof, an apparatus embodying the same, a method for controlling and/or operating the same, and computer program(s) controlling and/or operating the same as well as mediums carrying such computer program(s) and forming computer program product(s). Furthermore, it should thus be apparent that exemplary embodiments of the present invention provide, for example a partitioner, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
    at least one processor; and
    at least one memory including computer program code, where the at least one memory and the computer program code are configured, with the at least one processor, to cause the apparatus to at least:
    receive from a Radio Network Controller by the apparatus of a second network node that is connected to a user device of a communication network a reconfiguration message comprising a decoupling indication that is indicating a decoupling of an uplink grant for an uplink of the user device from a first network node serving the user device; and
    based on the reconfiguration message, provide the user device signaling comprising a radio resource control message to decouple the uplink grant from the first network node serving the user device and to couple the uplink grant to the second network node while a serving downlink from the first network node serving the user device is maintained.

2. The apparatus according to claim 1, wherein the at least one memory including the computer program code is configured with the at least one processor to cause the apparatus to:
    prevent, based on receiving the reconfiguration message, providing a downlink grant for a downlink from the apparatus to the user device.

3. The apparatus according to claim 1, wherein the communication network is a high speed packet access network.

4. The apparatus according to claim 1, wherein the uplink grant comprises a transmit power allocation.

5. The apparatus according to claim 1, wherein the reconfiguration message is based on a detection that the downlink serving the user device having a stronger signal strength than the uplink of the user device.

6. The apparatus according to claim 1, wherein the uplink grant comprises a modification of a dedicated channel configuration for the uplink grant.

7. The apparatus according to claim 1, wherein the decoupling comprises enhanced dedicated channel decoupling.

8. The apparatus according to claim 1, wherein the at least one memory including the computer program code is configured with the at least one processor to cause the apparatus to issue enhanced dedicated channel relative grants to the user device before receiving the reconfiguration message.

9. A method, comprising
    receiving from a Radio Network Controller by a second network node that is connected to a user device of a communication network, a reconfiguration message comprising a decoupling indication that is indicating a decoupling of an uplink grant for an uplink of the user device from a first network node serving the user device; and
    based on the decoupling indication, providing to the user device signaling comprising a radio resource control message to decouple the uplink grant from the first network node serving the user device and to couple the uplink grant to the second network node while a serving downlink from the first network node serving the user device is maintained.

10. The method according to claim 9, wherein the network node is embodied in a base station.

11. The method according to claim 9, wherein the uplink grant for the uplink of the user device is causing a transfer of the uplink grant for the uplink of the user device from the first network node to the second network node of the high speed packet access network.

12. The method according to claim 9, wherein the communication network is a high speed packet access network.

13. The method according to claim 9, wherein the decoupling is based on the downlink serving the user device having a stronger signal strength than the uplink of the user device.

14. The method according to claim 9, wherein the uplink grant comprises a modification of a dedicated channel configuration for the uplink grant.

15. The method according to claim 9, wherein the method is performed by a base station.

16. A radio network controller, comprising:
    at least one processor; and
    at least one memory including computer program code, where the at least one memory and the computer program code are configured, with the at least one processor, to cause the radio network controller to at least:
    determine to decouple an uplink grant of a user device from a first network node of a communication network serving the user device; and
    based on the determining, signal to a second network node connected to the user device of the communication network a reconfiguration message comprising a decoupling indication that is indicating a decoupling of the uplink grant of the user device while a serving downlink from the first network node serving the user device is maintained.

17. The radio network controller according to claim 16, wherein the determining is based on a radio resource control measurement report from the user device.

18. The radio network controller according to claim 16, wherein the determining is triggered by realizing a potential link imbalance situation based on one or more of the following triggers:
- a notice from a weak node that the uplink Signal to Interference and Noise Ratio is not changing even after the weak node has sent continuous commands to increase its uplink power to the user device;
- when an active set of user device comprises two nodes, which have different DL-Common Pilot Channel powers; and
- an uplink load increase of user device served by the weaker cell.

* * * * *